United States Patent [19]

Price

[11] 4,006,669
[45] Feb. 8, 1977

[54] PISTON AND EXTENSIBLE CYLINDER THEREFOR

[75] Inventor: William G. Price, South Bend, Ind.

[73] Assignee: The Bendix Corporation, South Bend, Ind.

[22] Filed: May 19, 1975

[21] Appl. No.: 578,693

[52] U.S. Cl. .................................... 92/13.1; 92/51; 188/71.8; 188/72.4; 188/79.5 GE; 188/196 R

[51] Int. Cl.² .................. F01B 31/14; F15B 15/24

[58] Field of Search ................ 92/26, 52, 13.1, 51; 188/71.8, 79.5 GE, 196 R, 72.4

[56] References Cited

UNITED STATES PATENTS

| | | | |
|---|---|---|---|
| 3,255,851 | 6/1966 | Griesenbrock | 188/196 F |
| 3,337,008 | 8/1967 | Trachte | 188/196 B |
| 3,376,959 | 4/1968 | Holcomb, Jr. | 188/196 R |
| 3,395,619 | 8/1968 | Grebe | 92/52 |
| 3,828,894 | 8/1974 | Crossman | 188/72.4 |
| 3,887,042 | 6/1975 | Ditlinger et al. | 92/52 |
| 3,887,047 | 6/1975 | Harnish et al. | 188/196 R |
| 3,903,999 | 9/1975 | Ditlinger | 188/196 R |

*Primary Examiner*—Martin P. Schwadron
*Assistant Examiner*—Abraham Hershkovitz
*Attorney, Agent, or Firm*—Paul David Schoenle; William N. Antonis

[57] ABSTRACT

A fluid pressure actuated piston is slidably carried in a fluid pressure actuated cylinder which, in turn, is slidably carried in a fixed carrier. Movement of the cylinder is resisted by a deformable tube frictionally engaged with a fixed circular member. A predetermined fluid pressure acting across a differential area wall portion of the cylinder generates a force overcoming the frictional resistance of the deformable tube engaged with the fixed circular member thereby advancing the cylinder in the direction of movement of the pressurized piston. The output force of the piston is substantially unaffected by the force imposed on the cylinder.

4 Claims, 2 Drawing Figures

PISTON AND EXTENSIBLE CYLINDER THEREFOR

BACKGROUND OF THE INVENTION

The present invention relates to fluid pressure actuated force generating pistons having an extended range of travel. Reference is made to U.S. Pat. application Ser. No. 480,797 now U.S. Pat. No. 3,915,063 in the name of R. J. Ditlinger and filed June 19, 1974 and/or U.S. Pat. application Ser. No. 490,631 in the name of R. J. Ditlinger et al and filed July 22, 1974, now U.S. Pat. No. 3,887,042 both of which are assigned to the assignee of the present invention for generally similar type piston and extensible cylinder apparatus wherein the present invention is an improvement thereover.

SUMMARY OF THE INVENTION

The present invention provides a brake actuating fluid pressure responsive piston slidably contained in a fluid pressure actuated cylinder which cylinder is held in a retracted position by deformable stop means connected to the cylinder and adapted to be deformed in response to a force derived from a predetermined fluid pressure acting on the cylinder to thereby permit the cylinder to advance axially toward the piston during a brake application.

The present invention provides a brake actuating fluid pressure responsive piston slidably contained in a fluid pressure actuated cylinder wherein the cylinder is normally held in a retracted position and actuated axially in follow-up relationship to the piston in response to a predetermined fluid pressure acting upon the cylinder during a brake application and wherein the piston output force remains in substantially constant proportion to applied fluid pressure throughout actuation of the cylinder.

DESCRIPTION OF THE PREFERRED EMBODIMENT

Figure 1:
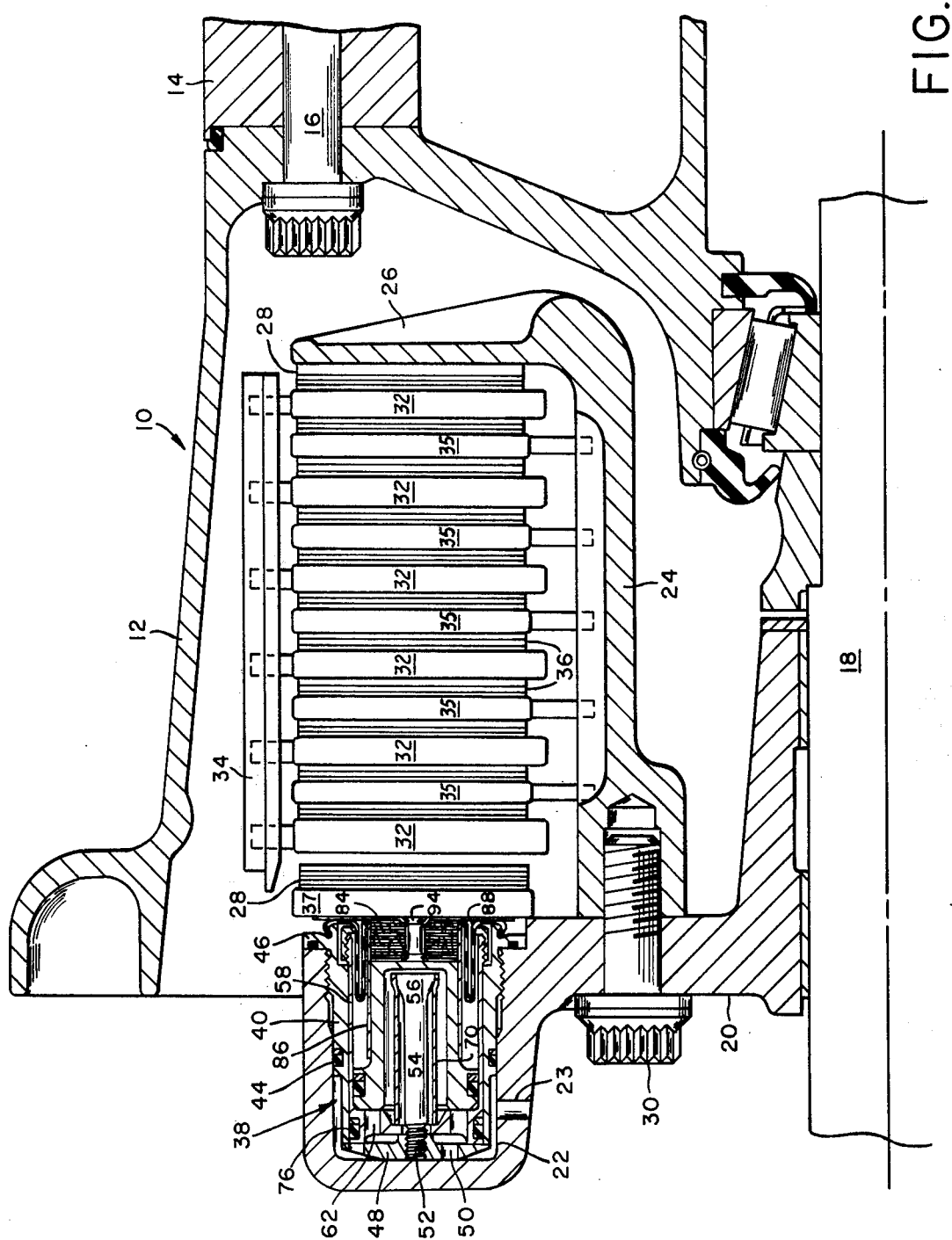
FIG. 1 is a sectional schematic representation of a conventional aircraft wheel and disc brake assembly embodying the present invention.
Figure 2:
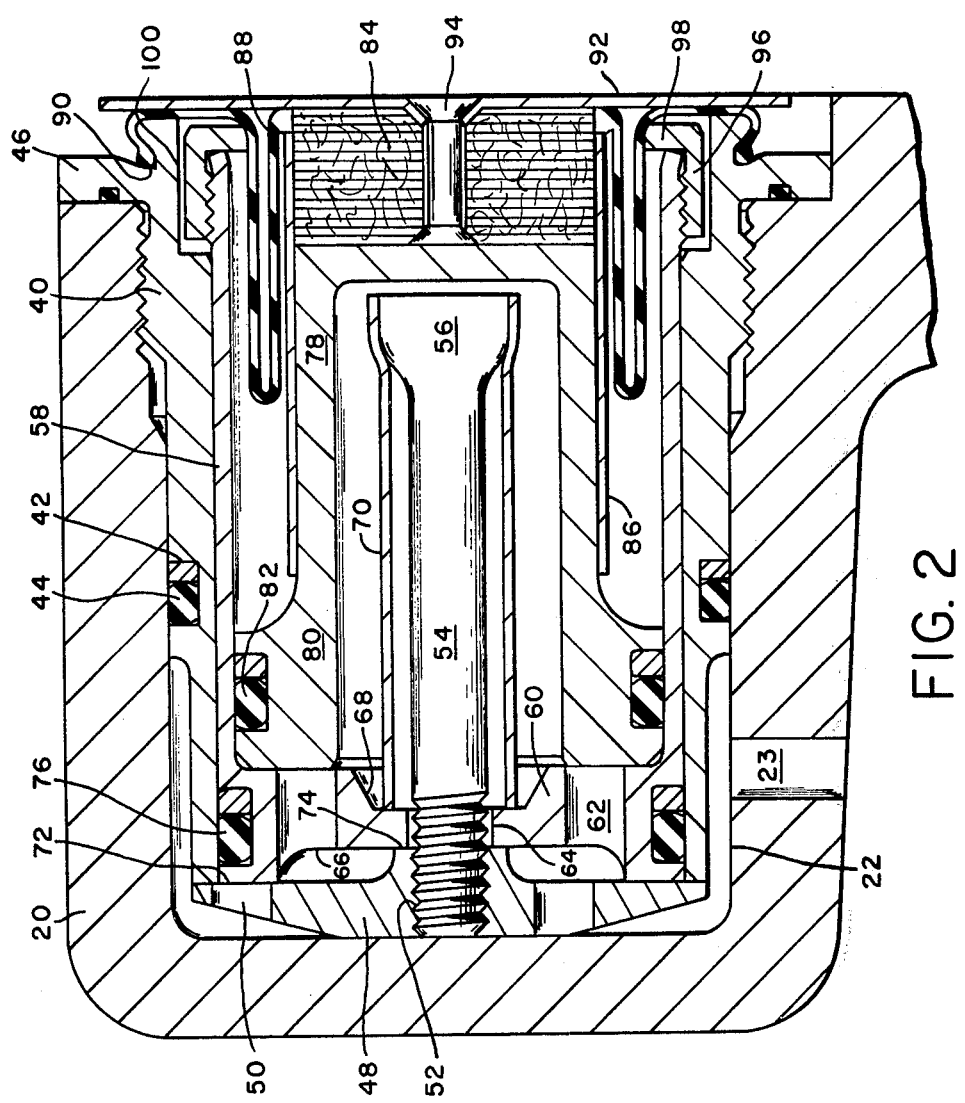
FIG. 2 is a sectional view of the present invention shown in enlarged form and removed from the wheel and disc brake of FIG. 1.

Referring to FIGS. 1 and 2, numeral 10 designates an aircraft wheel and multiple disc brake thereof. The wheel is defined by two annular sections 12 and 14, only one of which is fully shown, fastened together by circumferentially spaced apart bolts and nuts generally indicated by 16. The wheel is suitably journaled on a rotatably fixed axle 18 carried by conventional aircraft landing gear structure, not shown. An annular brake carrier 20 suitably keyed to axle 18 is provided with a plurality of circumferentially spaced apart cavities 22, only one of which is shown, suitably vented via passage 23 to a source of pressurized fluid, not shown, controlled by the aircraft pilot. A torque tube 24 having an integral backing plate 26 suitably lined with frictional material 28 is fixedly secured to carrier 20 by a plurality of circumferentially spaced apart bolts 30. A plurality of spaced apart annular brake rotor members 32 are suitably keyed to a retaining member 34 fixedly secured to wheel section 12 and adapted to permit axial movement of the rotor members 32 relative to wheel section 12. A plurality of annular brake stator members 35 having friction lining 36 secured to opposite faces thereof are suitably keyed for axial movement to torque tube 24. A pressure plate 37 suitably keyed for axial movement to torque tube 24 and, like backing plate 26, provided with lining 28, is adapted to be actuated by a plurality of piston means generally indicated by 38 disposed in cavities 22. Upon energization of the piston means 38 the pressure plate 37 is urged toward backing plate 26 thereby compressing the stacked stators and rotors 36 and 32 together to retard rotation of wheel sections 12 and 14.

The cavities 22 are each provided with a sleeve 40 threadedly engaged with carrier 20 and provided with an annular recess 42 containing an "O" ring or similar suitable fluid seal 44 as well as having a flange portion 46 adapted to be engaged by suitable wrench means, not shown, for assembly and disassembly purposes. A circular plate 48 having a plurality of spaced apart openings 50 and a central threaded opening 52 is held against the base of cavity 22 by sleeve 40 bearing against the radially outermost portion of plate 48. A stem 54 having one end threadedly secured in opening 52 extends from plate 48 and terminates in an enlarged diameter curved or flared portion 56. A cylinder 58 slidably received by sleeve 40 is provided with an end wall 60 having a plurality of spaced apart openings 62 and a central opening 64 through which opening 64 the stem 54 extends. The end wall 60 is recessed as at 66 on one side thereof and, on the opposite side, the central opening 64 is provided with a counterbore 68.

A radially deformable tube or cylinder 70 having an internal diameter slightly smaller than the diameter of the curved portion 56 is concentric with stem 54 and interposed between end wall 60 and curved portion 56 thereby holding the cylinder 58 in a fully retracted position, as shown, wherein radial outer and inner shoulders 72 and 74, respectively, of end wall 60 bear against plate 48. The cylinder 58 is suitably recessed to receive an annular O ring or suitable similar fluid seal 76 which resists fluid leakage between adjacent surfaces of cylinder 58 and sleeve 40. The deformable tube 70 is formed preferably from a suitable metal capable of deformation under a predetermined force application imposed thereagainst as will be described.

A cup-shaped piston 78 having an enlarged diameter rim portion 80 slidably engaged with cylinder 58 is adapted to telescope over tube 70 and abut end wall 60 when in a retracted position as shown. The piston 78 is suitably recessed to receive an annular O ring or suitable similar fluid seal 82 which resists fluid leakage between adjacent surfaces of cylinder 58 and piston 78. The base or closed end of piston 78 is provided with a layer of conventional heat insulation material 84 held in place therein by a cylindrical member 86 which telescopes over piston 78 and to which the material 84 is suitably bonded. A flexible annular seal of the well known rolling type 88 has its radial outer edge secured in a recess 90 in sleeve 40 and its radial inner edge secured to the heat insulation material 84. The seal 88 serves to prevent dust, dirt or brake debris from entering the interior of cylinder 58. A circular plate 92 fixedly secured to the heat insulation material 84 by suitable fastening means such as a rivet 94 extends radially therefrom over the sleeve 40 and seal 88 and abuts pressure plate 37.

An annular ring 96 threadedly secured to the open end of cylinder 58 has a radially inwardly extending annular flange 98 adapted to be engaged by rim portion 80 which serves as a stop preventing piston 78 from advancing axially beyond the end of cylinder 58. The sleeve 40 is provided with an annular recess 100 providing clearance between sleeve 40 and ring 96 when cylinder 58 is retracted as shown.

It will be noted the above described structure of piston assembly 23 is adapted to be assembled as a unit and subsequently positioned in cavity 22 by screwing sleeve 40 therein.

Assuming that the brake apparatus embodying the present invention is in position as shown in FIG. 1, a brake application by the aircraft pilot results in pressurization of the fluid supplied to cavities 22 and subsequent equal pressurization of pistons 78 which move away from the respective end walls 60 thereby forcing pressure plate 37 toward backing plate 26 to compress rotor members 32 and stator members 35 together to produce the desired braking action of wheel sections 12 and 14.

It will be noted that the end wall 60 has two effective areas exposed to the pressurized fluid supplied to cavity 22. The larger of the two areas is defined by the end wall 60 face adjacent plate 48 whereas the smaller area is defined by the end wall 60 face adjacent rim portion 80. The area difference between the two faces is equal to the annular cross sectional area of that portion of cylinder 58 extending from end wall 60. The resulting differential area multiplied by a predetermined maximum fluid pressure acting thereagainst generates a force adequate to overcome the frictional resistance of tube 70 bearing against flared end 56. However, at fluid pressure less than the predetermined maximum, the tube 70 will act as a stop against movement of cylinder 58.

Upon depressurization of piston 78 to release the brake, the pressure plate 37 and thus piston 78 bearing thereagainst are retracted under the influence of a plurality of brake adjusting and retraction units, not shown, connected to pressure plate 37 and carrier 20. Reference is made to U.S. Pat. application Ser. No. 387,093 filed Aug. 9, 1973 now U.S. Pat. No. 3,887,047 in the name of E. E. Harnish et al and assigned to the assignee of the present application for an example of suitable adjusting and retraction units of the above-mentioned type. It will be understood that the brake adjusting and retraction units, not shown, serve to automatically axially advance the pressure plate 37 to compensate for wear of the friction material 28 and 30 and retract the pressure plate 37 axially a predetermined distance to establish a corresponding predetermined brake running clearance upon release of the brake.

Assuming that repeated brake applications in the above-mentioned manner have occurred causing the friction material 28 and 30 to wear accordingly, the pistons 78 will be required to advance axially to a progressively greater extend relative to the cylinder 58 to compensate for the brake wear. If the cylinder 58 was held in the retracted position shown the piston 78 would be limited to the travel established by flange 98 which travel may be insufficient to compensate for remaining wear of the friction material 28 and 30.

However, to extend the range of travel of piston 78, the cylinder 58 is adapted to be urged in follow-up motion axially relative to piston 78 in either of two ways depending upon the fluid pressure imposed against end wall 60 and piston 78. To that end, a predetermined force generated by a predetermined fluid pressure acting upon the fixed differential area of end wall 60 drives the tube 70 against flared portion 56 causing the tube 70 to be deformed radially outwardly thereby permitting the tube 70 as well as end wall 60 bearing thereagainst to advance toward piston 78 into abutting engagement therewith thereby increasing the available travel of piston 78 in cylinder 58 accordingly. It will be understood that any force in excess of that required to deform tube 70 and imposed by cylinder 58 against piston 78 will be of little significance particularly if the predetermined pressure required to actuate cylinder 58 is close to maximum operating brake pressure. The permissible wear of the friction material 28 and 30 can be expected to be less than the range of travel provided by the axial advancement of cylinder 58 plus the axial travel of piston 78 therein.

Upon depressurization of pistons 78 the pressure plate 37 and thus pistons 78 as well as end wall 60 bearing thereagainst are retracted by the pressure plate 37 in response to the brake adjusting and retraction units, not shown, to provide the desired running clearance of the rotors and stators 32 and 35.

In the event of brake operating fluid pressures below the abovementioned predetermined fluid pressure at which the cylinder 58 is actuated in follow-up relation to piston 78, the piston 78 is pressurized axially relative to cylinder 58 and may eventually contact flange 98 depending upon the extent of wear of the brake. Upon engagement with flange 98, the piston 78 imposes a force upon cylinder 58 which augments the force derived from end wall 60 whereupon the resulting total force may be sufficient to overcome the resistance of tube 70 engaged with flared portion 56 causing the piston 78 and cylinder 58 to advance. The effective force of piston 78 applied to pressure plate 37 is somewhat reduced as a result of the force transmitted to cylinder 58 but it will be recognized that the percentage reduction relative to the total piston 78 force is relatively small.

It will be understood that applicant's invention as defined by the drawings and described in the specification is a preferred embodiment and various structural changes and modifications therein may be made without departing from the scope of the invention as set forth in the following claims.

I claim:

1. Fluid pressure actuated piston means and extensible cylinder means therefor comprising:
   a casing having a cavity therein;
   cylinder means slidably disposed therein and responsive to a pressurized fluid supplied to said cavity;
   a piston slidably contained by said cylinder and responsive to said pressurized fluid;
   stop means operatively engaged with said cylinder for resisting axial movement of said cylinder and adapted to be overcome in response to a predetermined pressure of said fluid to allow axial movement of said cylinder relative to said piston in response to said pressurized fluid;
   said stop means includes a deformable member engageable with said cylinder means; and
   a fixed deforming member engaged by said deformable member for deforming said deformable member in response to said predetermined pressure of said fluid acting against said cylinder means.

2. Fluid pressure actuated piston means and extensible cylinder means therefor as claimed in claim 1 wherein:
  said cylinder means is provided with an end wall having a differential area exposed to said pressurized fluid;
  said deformable member is a radially deformable tube bearing against said end wall; and
  said deforming member is a fixed stem extending through said tube and having a flared end portion forceably engageable with said tube.

3. Fluid pressure actuated piston means and extensible cylinder means therefor as claimed in claim 2 wherein:
  said stem is threadedly secured at one end to a plate member;
  said cylinder means is slidably contained by a sleeve threadedly engaged with said casing and extending into said cavity into engagement with said plate member;
  said plate member being fixedly secured in position against an end wall of said cavity.

4. Fluid pressure actuated piston means and extensible cylinder means therefor as claimed in claim 3 wherein:
  said plate member, stem, cylinder means, sleeve and piston are arranged in coaxial formation and assembled as a unit exteriorly of said cavity.

* * * * *